United States Patent Office 3,405,551
Patented Oct. 15, 1968

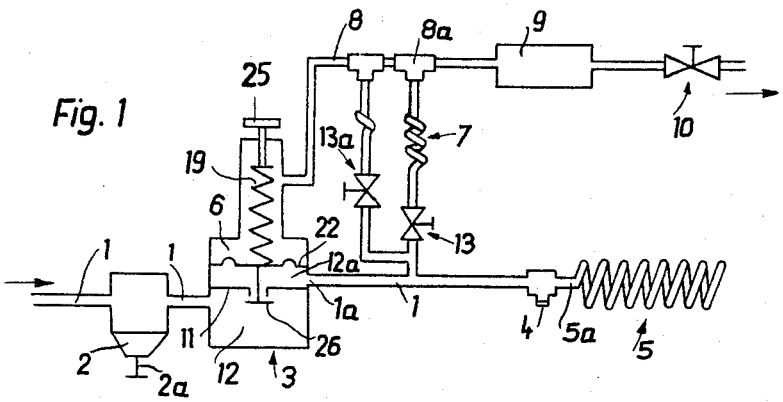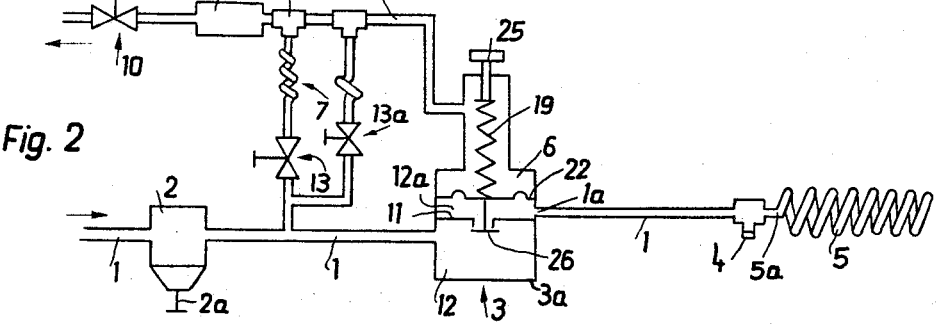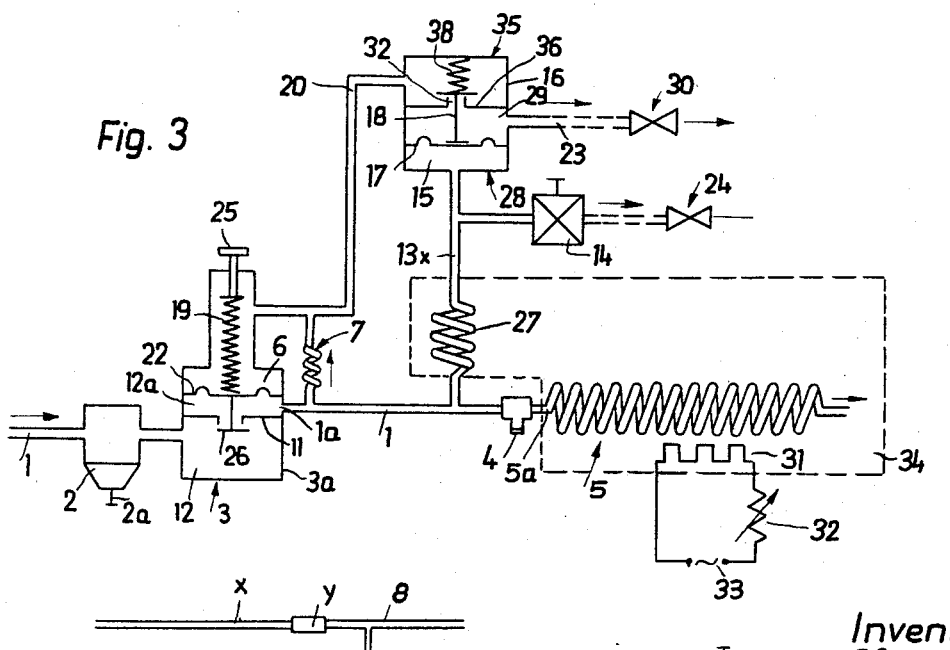

3,405,551
PRESSURE PROGRAM DEVICE FOR
CHROMATOGRAPHIC COLUMN
Istvan Halasz, Wolfsgangstrasse 121,
Frankfurt am Main, Germany
Filed Sept. 7, 1965, Ser. No. 485,516
Claims priority, application Germany, Sept. 8, 1964,
H 53,729
20 Claims. (Cl. 73—23.1)

ABSTRACT OF THE DISCLOSURE

A control apparatus for automatically adjusting the inlet gas pressure of a chromatographic column, comprising in addition to a reducing valve and control valve in the gas lines supplying the chromatographic columns, an automatic pressure-responsive regulator tending to maintain a constant gas pressure at the supply to the column, and an auxiliary control means which alters the constant-pressure characteristic of the automatic regulator by applying a control gas pressure thereto whereby the control valve responds to pressure changes in the supplied gas. Such arrangement enables a timed pressure program to be had, as distinguished from operation where the gas pressure at the chromatographic column is held practically constant.

In gas chromatography there is increasing interest in automatically controlling the pressure of the carrier gas before it enters the inlet of the chromatographic gas column. Up to now, for this purpose the chief effort has been to maintain constant the inlet pressure of the carrier gas at the column and also at the same time maintain constant the velocity (of the mass). To effect this, a control valve which contains a pneumatically actuated device was put in the carrier gas line before the column. This actuated device (for example, an adjustable or elastic membrane within the structure of the control valve) was subjected on one of its sides (in a chamber of the control valve) to the pressure of the carrier gases which entered this chamber ahead of the controlled valve opening and left beyond the valve opening, being thus actuated according to the position of the valve device. The valve thus controlled the pressure of the carrier gas at the exit side of the valve chamber and consequently before its entrance at the column.

To the entering side of the membrane, a throttle device (namely, preferably a reducing valve) is connected, being placed in the supply line of the carrier gas and being preferably adjustable. This reducing valve determines the maximum possible pressure peak of the gas before the column.

In the pneumatically controlled valve, on the other side of the movable membrane, namely on the so-called counterpressure side, the actuated valve member was charged by a compression spring located within a chamber which was separated from the above mentioned chamber by the membrane, and separated from the gas inlet by the valve member. The tension of the spring worked against the prevailing pressure of the carrier gas on the first side of the membrane in such a manner that it managed to keep the valve open as long as the counteracting pressure of the carrier gas at the entrance of the column was essentially less than the maximum pressure of the gas as permitted by the throttle device in the supply line of the carrier gas. If the pressure of the gas at the entrance of the chromatographic column decreases (whether caused by reaction of the gas column or by anything else, for example, an increase of temperature), then such change of pressure has the following immediate effect on the control member or membrane of the control valve; the membrane moves and the valve is opened wider through the pressure of the spring, so that more carrier gas from the supply line can flow until the pressure of the gas ahead of the column has virtually returned to the former pressure value. The inverse effect occurs with transient increase of the pressure drop in the column and increase of the initial pressure before the column. Since only small movements of the control membrane of the valve device are involved in these control conditions, the spring characteristic of pushing against the carrier gas pressure in the open position of the valve plays a nominal role, so that the column operates with a practically constant inlet pressure and carrier gas mass velocity where the pressure and speed are considerably less than the maximal pressure of the carrier gas determined by the throttle member of the supply line with which maximal pressure the column might be operated.

In the fact of this method with practically constant pressure of the carrier gas at the inlet of the column, there is great interest in constantly regulating this inlet pressure and the carrier gas mass velocity according to a defined program, preferably programmed such that this pressure and velocity during a working period of the column constantly or intermittently increase with the time from the beginning of the introduction of carrier gas or of the initiation of the trial until the end of a working period.

An object of the invention is to provide an improved method and means to maintain the desired pressure program in cases where the column is operated with a constant temperature (isothermally) and also in cases where the column is operated with a variable temperature program, or in cases where temperature changes in the column are equalized according to the pressure program manually or automatically by changes of heating of the column. In the latter case according to the invention the pressure program either may be automatically accomplished independently of the temperature program or temperature pattern in the column, or may be automatically controlled in retroaction variably according to the temperature program or temperature pattern in the column.

In all these cases, the above-mentioned control of the pressure and of the mass velocity of the carrier gas is effectively realized by the pressure program means provided according to the invention. In consequence, the time of analysis in the column can be shortened compared to the working methods known so far, and trial mixtures with even broadly scattered retention values can be analysed. Furthermore, the tailing or delay effect i.e. time required to restore normal pressure and flow can be prevented or at least reduced, especially when working with greater quantities.

Preferably, the pressure at the inlet of the column should increase in time more or less exponentially. But according to the invention, a pressure program can be arranged whereby the pressure at the inlet of the column involves time according to another function of pressure with time, e.g. according to the quotient of two tangent-hyperbolic functions; in both cases, the increase of pressure in the program can precede an introduction period in which the pressure at the inlet of the column is maintained constant in an already familiar fashion, or conversely be preceded by said period of constant pressure at the inlet of the column.

To achieve its goals, the invention proceeds from the abovementioned kind of control device that possesses a control valve for the carrier gas, disposed before the chromatographic gas column (now called the "principal" column), in which the pneumatically operable member is subjected to the carrier gas pressure at the inlet of the column to close the valve and with a counter force to open the valve and possesses a throttle member (for example, an adjustable reducing valve) in the carrier gas line which determines the maximum inlet pressure of the carrier gas.

With such a control arrangement, one can attain by means of the invention as later described a desirable automatic programmed adjustment of the inlet pressure at the inlet of the principal column. According to the invention a leading pneumatic control circuit is provided, branching off from the carrier gas line in which the control valve is disposed between the inlet throttle member and the principal column for the carrier gas, said control circuit including at least one pressure decreasing means which has the same effect as providing a decreased pressure, in relation to the carrier gas pressure, as a control medium at the counter pressure side of the control valve. In other words, the control branch provides a reduced pressure against the spring-urged side of the valve actuating membrane, which counteracts the gas pressure at the counter-pressure side of the membrane, thereby having the net result of effecting a lower gas pressure at the counter pressure side as far as the membrane is concerned, without actually causing such lowered pressure.

In order to be able to easily vary the pressure program in accordance with some ways of carrying out the invention, there is provided at least one variable pressure decreasing means for the carrier gas in the control branch, which can be changed to effect various values of decreases of pressure. In addition to said variable means, a second pressure decreasing means for branched carrier gas can be provided (according to another means of carrying out the invention) in another branch line connected at a point in the gas line leading from the control valve, which second means lies parallel to the first pressure decreasing branch line; with such arrangement the control circuit may contain an opening and closing control valve between the carrier gas line and at least one of the two or more pressure decreasing means for the branched carrier gas. By means of such an opening and closing control valve, this other control circuit and consequently the entire control means can be stopped or rendered inoperative if only one pressure decreasing arrangement is desired. In this event the appropriate spring charged control valve will maintain a constant pressure at the inlet to the principal column. If two or more such pressure decreasing arrangements are provided in a parallel connection, then one of these pressure decreasing arrangements can be switched off by means of the proper closable valve and instead another can be inserted into the control circuit, which other introduces a different pressure decrease than the one that was switched off. Thus, the pressure program can be arbitrarily varied by means of these procedures.

In all these cases, each of the pressure decreasing arrangements for the branched carrier gas can be either a throttle device (for example, in the form of capillary lines built into the control circuit in series) or a substitutable turnable throttle valve.

In some executions of the invention, a contrivance is also added between one or more of the pressure decreasing arrangements for the branched carrier gas and the carrier gas line, which has a time constant (similar to the capacity C in an electric circuit) characterizing the progress of the control. The ohm (which equals R in an electric current circuit) may be likened to the flow resistance of the pressure decreasing arrangement, according to the invention. The contrivance for introducing a time constant in the control circuit preferably embraces a means which permits a regulation or correction of such time constant, depending on the program.

In carrying out the invention, the means that conditions or regulates the time constant can be a chamber which is gas-proof and closed off from the atmosphere, and which is interchangeably attached in order to exchange the time constant for that of a like chamber of other space content in the same position. The space content of the chamber, which gradually gets filled with the branched off carrier gas up to the pressure at the outlet of the pressure decreasing arrangement, determines the magnitude of the time constant.

Instead of such a chamber, an interchangeable running or open-ended conductor piece or tube at the above mentioned position in the control circuit can directly provide this time constant and can be exchanged for a conductor piece with a different space content or size (diameter).

Another advantageous means of changing the time constant can be a valve attached to the gas-proof chamber or to an equivalent conductor piece, either additionally or by eliminating the interchangeability. Such a valve can be regulated or completely cut off, and can effect a variable throttling of the carrier gas current by discharging to the atmosphere.

Because the pressure decreasing arrangement which is connected to the counter-pressure side of the membrane of the control valve transfers a smaller pressure on such side as compared with the effective pressure on the other or first-mentioned side of the membrane, a constantly effective force must yet be applied to the counter-pressure side in an already known way, as for example by means of the spring which tends to move the membrane to its valve-opening position. If this additional and practically constant (for small movements) force were not provided, then the deductive pressure would have to be transmitted in a troublesome way from the pressure-decreasing arrangement to the membrane of the control valve by for example electric means or relays. But this would result in an unnecessarily complicated way of putting the control valve into effect.

According to the time element which it is desired to have in the prescribed program for the control of the carrier gas pressure, the invention provides two possibilities which differ only in the connection point of the control (or feed back) circuit which has the pressure-decreasing arrangement. If one wants to maintain a steep exponential function for the increase of the carrier gas pressure with time, then the control circuit is branched off from the carrier gas line at a point beyond the outlet of the control valve. If one wants to effect a less sharp climb of the carrier gas pressure with time, then the control circuit is branched off from the carrier gas line before its inlet into the control valve. With this latter one gets for example, a pressure control after turning on the control circuit, which represents the quotient of two functions of hyperbolic tangents of the time.

In both ways of carrying out the invention, the above-mentioned time factor means (that is, the chamber of changeable volume which is attached to the control circuit and is preferably equipped with a controllable and separable exit tube for a part of the gases flowing in the control circuit) is a determining factor by virtue of the respectively chosen volume of such chamber and/or the steepness of the pressure-time function of the control program as determined by means of the adjustment of the throttle valve connected to the chamber outlet.

With the above-mentioned ways of putting the invention into effect, it is pre-supposed that the pressure program will control the gas pressure independently of the temperature conditions existing in the principal chromatographic column, and also of the column. It has been assumed that the temperature in the column remains assumed that the temperature in the column remains constant during a chromatic gas working period, as for example by thermostatic heating. In any case, in the above explained forms of the invention no provision is made to effect a temperature program for the principal column, whether it be for a constant temperature or for increasing or decreasing temperatures, or changes in temperature caused by reactions in the principal column; nor has a temperature program been taken into account for the pressure program.

The goal of realizing a temperature programming additionally and/or in connection with pressure programming, is achieved in still another embodiment of the invention. In this case, an auxiliary column constituted as a pressure-decreasing arrangement for the carrier gas is planned, which column is maintained at the same temperature as the principal column by means of thermostatic controls or other means, preferably disposed in the same structure where the principal column is located (the inner space of which can be thermostatically regulated and preferably also thermostatically heated).

In order to produce equivalent conditions of heat transition per unit length as with the principal column, the auxiliary column preferably has the same development (in each cross-section at right angles to the direction of the current) as the principal column. For example, the auxiliary column has the same pipe cross-section and has the same diameter in the snakepipe convolutions, but the auxiliary column is considerably shorter than the principal column, that is, with considerably fewer convolutions.

By this organization the carrier gas which is branched off from the main carrier gas line to the auxiliary line, produces an essentially smaller pressure decrease than that which occurs in the principal column. Also, I have found that this pressure decrease in the auxiliary line is for all practical purposes proportional to the pressure decrease in the main column during the whole process of the chromatographic gas working period. In contrast to the other methods which tried to employ the carrier gas pressure at the end of the principal column as a control medium for regulating the supply of the carrier gas supplied to the principal column (which methods did not stand the test because of the temporal inertia of the response of such control medium), the pressure decrease or the pressure, respectivly, ahead of the principal column is used as a control medium in a control circuit which according to the invention, is constituted as a feed-back device leading to the counter-pressure side of the membrane for the control valve located either ahead of or else beyond the auxiliary column.

In the practical application of this further development of the invention—for not only a programmed procedure but also for a control of the carrier gas pressure at the inlet of the principal column as effected by the auxiliary column, there is further provided a device (preferably a second pneumatic control valve) arranged in the control circuit and between the auxiliary column and the control valve, which inverses the conducers of those changes that take place at the end of the auxiliary column. This, for example, provides from the carrier gas an increase in pressure, which is brought to act on the counter-pressure side of the membrane of the first control valve in response to the above-mentioned pressure, resulting in the desired regulation of the carrier gas pressure at its inlet through causes originating in the principal column. In consequence, the control valve is made to open wider, tending to adjust the occasionally decreased pressure at the inlet of the principal column to its desired or maximal value according to the program.

In this last-mentioned application of the invention, there is further provided a second pressure-decreasing device of the kind already mentioned; for example, a capillary tube or a throttle valve which branches off from the carrier gas line like the auxiliary column but at a point ahead of same, being connected between the outlet of the carrier gas leading from the first control valve and the inlet to the principal column. The outlet of this second pressure decreasing device and of any additional devices which are attached to the carrier gas line in the described manner, must be connected to a line or lines leading to the first mentioned control valve in such a way that the direction of any flow from this connection point is toward the above second-mentioned control valve (or toward an equivalent device which inverses the pressure in the control circuit). In this case, the second or every additional pressure decreasing arrangement which is parallel to the auxiliary column in the control circuit, does not serve for the production of a control valve, but instead for the production of energy that acts on the second adequately adjusted, pneumatic control valve above-mentioned. Further, preferably a chamber is connected to the control circuit and/or to this second control valve in order to change the time constant of the control circuit, said chamber having a changeable volume and acting as a side branch or else in parallel to the control circuit; and/or a closeable and adjustable throttle valve that discharges into the atmosphere can be connected to said chamber or to the control circuit at a point ahead of and/or beyond the location of the pressure inversion.

In the drawings, four applications of the invention are schematically shown as exemplary thereof.

FIG. 1 illustrates an apparatus for programming of the pressure at the inlet of the principal column regardless of temperature and other possible changes caused by reaction in the principal column. The equipment shown effects a pressure program which, for at least part of the working period of a chromatic gas study, causes a strongly exponential pressure increase with respect to time.

FIG. 2 is an apparatus illustrating an independence from the principal column as extensive as with the device of FIG. 1. In FIG. 2, for at least one section of the working period, the increase of pressure occurs less sharply with respect to time.

FIG. 3 illustrates an apparatus in which conducers that effect end changes of the principal column can be planned for, in addition to a predetermined temperature program for the principal column on which the pressure program is dependent.

FIG. 4 is a fragmentary showing of a substitute organization for a portion of FIG. 2.

In the apparatus shown in FIG. 1, the carrier gas supply line is indicated in all its parts at 1, and contains adjacent the source of carrier gas (not shown) a reducing valve 2 which in a known way through an adjustment member 2a, effects or maintains a predetermined maximal gas pressure. The line 1 leads from the reducing valve 2 to the introductory chamber 12 of a control valve 3, which chamber in the valve housing is separated from an exit chamber 12a by a partition 11. The partition or wall 11 has a valve opening and seat controlled by a valve 26. The valve 26 is actuated by a diaphragm 22 in the housing 3. The chamber 12 has an outlet 1a. A space 6 above the diaphragm 22 is disposed at the so-called counter-pressure side of the diaphragm and is part of a feed-back type pneumatic control circuit for the valves 3, 26, by virtue of fluid counter-pressure on the upper side of the diaphragm.

The control valve 3 also has a compression spring 19 acting downward on the upper side of the diaphragm 22 and tending to unseat the valve 26. The spring 19 is regulated by an adjustment screw 25, by which the diaphragm 22 and valve 26 may be preset in relation to the pressure of the carrier gas as required and according to the given program.

The carrier gas line 1 leads from the outlet 1a to an introduction fitting 4 (which may include a valve) connected to the entrance 5a of a principal chromatographic column 5, which latter is formed in the usual fashion, for example, as a snakepipe of given diameter and given number of convolutions.

The organization described so far is considered to be known except for the action of the feed-back arrangement. FIG. 1 shows a pneumatic feed-back control circuit which is described further on. Without the feed-back device above would operate as follows:

Carrier gas from the source (not drawn) flows through the reducing valve 2 into the chamber 12 of the control valve 3 and through the seat of the valve 26 into the chamber 12a, thence through the outlet 1a to the fitting 4. From the fitting 4 the gas and test materials introduced through the fitting at varying time spans pass into the principal column 5 and are then analyzed in a known way. Discharge of the column 5 is at the right end.

In the column 5 a pressure decrease occurs according to the operation, temperature and incipient reactions—that is, absorption processes—of the column. This pressure decrease is usually changeable during the running or test (examination) period and on it depends the respective, changeable pressure of the gases at inlet 5a. This inlet pressure also exists at the outlet 1a of the control valve and in the chamber, acting on the diaphragm 22 in a direction tending to close the valve 26. Spring 19 opposes such action. tending to keep the valve 26 from its seat, and in open position. If the gas pressure at the entrance to the column 5 decreases sufficiently, then the pressure of the carrier gas in the space 12a of the control valve is overcome by the counterforce of the spring 19, so that the valve 26 shifts downward and allows more carrier gas from the reduction valve 2 to enter and reach the column 5 until a balance is again established between the forces on both sides of the diaphragm 22. In the case of a pressure rise at inlet 5a of the principal column 5, the opposite occurs in the control valve 3, tending to close the valve 26 until the pressure rise levels off.

Since only small movements of the diaphragm 22 are involved, the effective spring characteristic is almost constant, having no measurable variations but instead maintaining an almost constant gas pressure at entrance 5a of principal column 5 independently of circumstances of pressure decline and/or temperature changes within the column.

An object of the invention is effective control of gas pressure and flow at the pressure inlet 5a of the principal column in accordance with a proposed pressure program, by which the gas pressure and therefore also the mass velocity of the carrier gas in principal column 5 is varied at least during a longer interval or portion of its work period according to a certain law, thereby to obtain advantages for an analysis which is to be made, especially the advantage of effecting a shortening of the analysis time. Above all, the invention provides that the gas pressure at the entrance 5a of column 5 can, at least in one interval of a work period, be brought as close as possible to the maximum obtainable pressure as supplied from the reducing valve 2. Prior to the invention, the pressure which was practical at the inlet 5a averaged considerably less than the maximal pressure obtainable from the reducing valve 2.

This object of the invention, according to its apparatus of FIGURES 1 and 2, is attained independently of possible changing circumstances in the principal column 5, especially without a temperature program and for isothermal operating conditions, as follows:

A control or pneumatic feed-back circuit is provided, having parts 13, 7, 8 (described further on), such circuit comprising a side branch leading from the carrier gas line 1 to the counter-pressure side or chamber 6 of control valve 3. According to FIGURE 1, the circuit branches from a location beyond outlet 1a of control valve 3. According to FIGURE 2 the circuit branches from the carrier gas line 1 at a location ahead of the introductory chamber 12 of control valve 3 and beyond the reducing valve 2. In both cases the branch circuit absorbs a certain small amount of carrier gas when a valve 13 in the circuit is open. In the closed position of the valve 13, the apparatus operates in the previously known and explained manner, namely with a practically constant gas pressure at inlet 5a of the principal column 5. Thereafter, to start a time program for the pressure, the valve 13 (which is preferably conceived as a bar or slide valve) is opened.

In the branch circuit containing the valve 13 and beyond the latter there is, in FIGS. 1 and 2, a pressure decreasing device 7 which acts as a throttle to limit to a small predetermined amount the carrier gas which flows in the branches through the valve 13. The device 7 may be a coil or capillary tube or else a throttling valve which is adjustable to effect different flows for the purpose of changing the pressure program. If the valve 13 is of the throttling type it could substitute for the coil 7. If the throttle mechanism or valve is not adjustable, it could (for the purpose of changing the pressure program) be made interchangeable and should preferably be incorporated in the control circuit in such a manner that it can be easily exchanged for another pressure decreasing mechanism which will evoke another pre-given pressure decrease for the branched carrier gas. In the apparatus of FIGURES 1 and 2, the pressure decreasing arrangement 7 may be likened to the ohmic resistance (R) in an electric control circuit, preferably a variable resistance.

Instead of providing an interchangeable pressure-decreasing device 7, one or more pressure-decreasing devices of the same kind could be used connected in the control circuit in parallel. These devices could have different flow resistances, and could be switched off and on by a suitable bar valve or set of valves.

According to FIGURES 1 and 2, the tube 8 connecting the pressure decreasing arrangement with the counter-pressure side or space 6 of the control valve 3 represents a chamber. The space content of the tube 8 determines the time for the pressure which is transmitted from the outlet of device 7 to the counter-pressure side 6 of the control valve 3 to become effective in exercising the control function. Using an analogy with an electric control circuit, the space content of the tube 8 would be like a condenser having a given capacity C, which would determine the so-called time constant of the control circuit.

In order to be able to change this time constant of the control (branch or feed-back) circuit according to a pre-given pressure program, the tube 8 can be interchangeably connected (in series) in the control circuit so that it can be replaced by a tube of different space content. This possibility is symbolically represented in FIGURES 1 and 2 by showing a chamber 9, connected to the control circuit as a side branch (which branch could as well have a chamber of different space content than that shown). Chambers such as 9 could be exchangeable, to change the time constant of the control circuit.

The tube 8 or specifically the chamber 9 connected to the tube as a side branch, is supplied with an outlet for the branched carrier gas, which causes a throttling effect on its release and which is preferably openable and closeable via a bar valve 10 and/or is adjustable to different flow resistances.

The theoretical value of the desired carrier gas pressure at the outlet 1a of control valve 3 is adjusted according to the pregiven pressure program, by adjusting the tension of spring 19 by means of the adjustable screw 25. If valve 10 is closed or not provided (in the latter case for example, the chamber 9 may consist merely of a tube like the tube 8 and having an equivalent volume), the theoretical value of carrier gas pressure can as well—or in addition to the adjustment of spring 19—be regulated at outlet 1a alone or additionally through pressure which acts on the upper or counter pressure side of the diaphragm 22. The mechanism shown in FIGURE 1 or 2 functions as follows:

Before operating, the maximal pressure at the reducing valve 2 is adjusted as one wishes, in such a manner that it is sufficiently above the desired carrier gas pressure in the inlet chamber 12 according to the given program. The operator then closes the valves 13 and 10.

By means of the adjustment screw 25 and the gas pressure which is manifested in the counter pressure chamber 6, the control valve 26 is adjusted to the minimal desired inlet pressure of the carrier gas in chamber 12 according to the program.

If a starting work period of column 5 characterized by a constant pressure is desired, then the valve 13 is closed for the starting time and thereafter opened. After opening of the valve 13 the carrier gas will flow not only into column 5, but also into the branch line having the pressure reducing device 7 and thence into the line 8 to the counter pressure chamber 6. As a result, the pressure in this chamber increases and at the same time the pressure of carrier gas at the outlet 1a of the control valve increases. Consequently, more carrier gas flows into principal column 5, and simultaneously more "branched" carrier gas flows through the mechanism 7 and through line 8 into chamber 6. Therefore, the valve 26 is opened more, and the pressure at the outlet 1a of the control valve 3 is still further increased until it completely or nearly completely attains, as desired, the pre-given maximal pressure possible of the reducing valve 2. The line 8 may be considered as a "gas-tight chamber," since its volume can be largely compared with the volume of the snake tube or throttling device 7.

The apparatus according to FIGURE 1 operates at this increasing pressure whereby the pressure at inlet 5a of principal column 5 gains with time according to a steep exponential function. The steepness of the exponential curve can be changed by exchange or adjustment of the pressure-decreasing or throttling mechanism 7 or by utilizing one or more of several throttling mechanisms connected, in the above-described manner, in parallel with one another to provide flow resistance according to the desired program. The needle valve 10 is more or less opened if, in the pressure program, it is planned that during a certain time span, the pressure at inlet 5a of the principal column 5 will not increase but rather will decrease. Then, a part of the carrier gas which is usually branched no longer reaches the counter pressure chamber 6 and the pressure therein drops with time, as determined by the time constant given the program via adjustment of the valve by 10 and the volume 9, i.e., the "capacity" of the line 8.

In FIG. 1 the member 7 is shown as threaded into the T-fitting 8a and into the valve 13, whereby it is detachably secured and may be readily removed and replaced by a throttle device of different characteristic.

Also, the line 8 may be threaded into the fitting 8a and into the housing of the control valve assemblage 3, for removal and replacement by a line of different capacity or volume.

Paralleling the throttling device 7 may be another throttling line 13a of different characteristic, as shown in FIG. 1.

In FIG. 4 the line 8 is shown as connected by a coupling Y to an extension line X which may constitute a replacement for the chamber 9 and be made the equivalent thereof by variation of its diameter and length.

In the appended claims the part 2 is referred to as a "reducing valve," its output being termed an "output gas line." The valve 26 and its seat is referred to as a "control valve." The output 1a is referred to as an "outflow gas line." The diaphragm 22 as well as its connection to the valve 26 is referred to as an "automatic means including a pneumatic-pressure-responsive device" (the diaphragm) for actuating the control valve to maintain constant gas pressure. The feedback system 13, 7, 8, 6 and upper surface of the diaphragm 22 are referred to as an "auxiliary control means for applying a reduced gas pressure" to the diaphragm, tending to open the control valve.

The apparatus of FIGURE 2 is different from that of FIG. 1 in its operation, in that when the valve 10 is closed and the valve 13 is open, the pressure at the inlet 5a of the principal column 5 is not exponential with time but rather increases according to a function which essentially is represented by the quotient of two tangent-hyperbolic functions.

Also, the apparatus of FIGURE 2 differs from that of FIGURE 1 in that the portion of the control circuit comprising the parts 13, 7, 8 and—in a given case— 9 and 10, is branched off at a location beyond the reduction valve 2 and ahead of the control valve 3.

In both apparatuses the valve 13 is closed after completion of the desired pre-given pressure program. The chamber 6 is now connected with the surrounding atmosphere by opening the valve 10 whereby the pressure at outlet 1a of the valve assemblage 3 rapidly falls away.

In the apparatus according to FIGURE 3, the reference numbers for parts already known and mentioned are the same as in FIGURES 1 and 2. In FIG. 3 the principal column 5 is subjected to a predetermined selected temperature program. For this purpose it is, as usual, enclosed in a casing 34 which contains a heating element 31 which is fed by a source of current 33 and regulated manually by a resistance control 32 or else thermostatically regulated in the well known manner to maintain a constant temperature in the casing.

It is now noted that the current or flow resistance of the column 5 increases with rising temperature, due to the viscosity of the inrushing gas, so that frequently, when in a known manner the carrier gas mass flow is kept constant at the inlet 5a of the column, the flow velocity at the outlet diminishes with the heating of the column. It may take hours until the gas flow at the column outlet readjusts itself to the desired value if the control circuit, according to the invention, is not utilized, as for instance if the feedback flow is blocked at the location 13x.

In order to keep the flow velocity of the gas at the outlet of column 5 (in FIG. 3) at a constant level even with changes of the column temperature, it is necessary to have a correspondingly variable pressure at its inlet. For this purpose and similar purposes of temperature programming, a so-called auxiliary column 27 is provided and connected to the carrier gas line 1 at a location between the control valve assemblage 3 and the column inlet 5a. This auxiliary column 27 is is the same casing 34 so as to have the same temperature as the principal column 5. The auxiliary column 27 must suitably be formed in a like manner structurally, for instance, with the same diameter and the same tube cross-section of the snakepipe, whereby its pressure decrease per unit of length is the same as that of the principal column 5 throughout, but in total pressure drop considerably less than the total pressure drop of the principal column 5 inasmuch as it is shorter and has fewer convolutions.

From the outlet of the auxiliary column 27, a tube (see location 13x) leads to chamber 15 of a second control valve assemblage 28 which has a chamber 16 connected by a line 20 to the counter-pressure side or chamber 6 of the first control valve assemblage 3.

The control valve assemblage 28 contains a diaphragm 17 in the casing 35, connected with a valve 18 which cooperates with a seat 32 in a partition 36. A valve spring 38 biases the valve 18 downward against the seat 32 and biases the diaphragm 17 downward against pressure in the chamber 15.

Chamber 16 which is situated above the diaphragm 17, has an outlet to the connecting line 20 which leads to chamber 6 at the counter-pressure side of the diaphragm 22. The line 20 at a point adjacent the chamber 6 is connected with the outlet of a pressure reducing device 7, whose inlet is connected beyond the control valve 3 to the carrier gas line 1. The device 7 receives a small, "branched-off" portion of the carrier gas, in the direction of the arrow shown.

In the apparatus according to FIGURE 3 however, the pressure-reducing device 7, for instance, a capillary tube, is not primarily used for transmission of a control quantity of gas to the chamber 6 but rather for transmission of pneumatic energy to operate the second control valve 18, such energy being manifested in the chambers 16 and 29 on both sides of the partition 36 above the diaphragm 17. However, the explanations of FIGURES 1 and 2 concerning the functioning of the pressure-reducing device 7 are obviously equally valid for the apparatus of FIGURE 3.

The pressure-reducing device 7, in all forms according to FIGURES 1 to 3 preferably shall be kept—as much as possible—at constant temperature; and can therefore be kept (although not shown) in a casing separate from the casing of the column (34 according to FIGURE 3) or it can be heated and thermostatically regulated separately (not shown) in a usual well-known manner. Room temperature conditions have been found normally to be sufficient.

The dimensioning and/or adjustment of the pressure-reducing device or devices in FIGURES 1 to 3 and, concurrently, the flow resistance must be related in a stable manner for operation with the remaining parts of the control device, particularly at a gas pressure at the inlet of the column 5 which is regulated by the temperature of the column. Thus it is always possible to succeed in keeping the desired predetermined gas mass flow of the principal column 5 at practical constant level, i.e., plus or minus 1–2%.

It is of special advantage then that, for variations of the carrier gases and/or test-substances as well as in the temperature program, there is no need for a new dimensioning of the parts of the control mechanism, especially the pressure-reducing device 7.

In the case of the temperature programmed application of the invention according to FIGURE 3, the pressure-reducing device 7 connected to the second control valve assemblage 28 acts on the diaphragm 17 through the valve opening 32 with a counter pressure that aids the spring 38 and is variable in accordance with the pressure of the carrier gas in conduit 1 ahead of the device 7. This counter-pressure balances out with the pressure which is transferred from the outlet (upper end) of auxiliary column 27 to the underside of the diaphragm 17 (into chamber 15) and which likewise changes with the pressure of the carrier gas ahead of the inlet 5a. In order to enable regulation of this action to be effected before starting operation of the control mechanism in the aforementioned sense in proportion with the exigencies of a pressure or temperature program, the counter pressure chamber 29 of the second control valve assemblage 28 is opened to the atmosphere through a conduit 23. The conduit is arranged to counteract the discharge of gas into the atmosphere by its flow resistance, which shall be adjustable in this sense. For this purpose, an adjustable valve 30 can be attached to the conduit 23. This valve shall be adjusted in such a manner that e.g. with an increasing temperature program its flow resistance shall at moments of its regulation be smaller than the flow resistance of the pressure reducing device 7, or of several such devices if a plurality are used, and conversely shall be greater with decreasing temperature program.

It is evident that the second control valve assemblage 28 operates so as to reverse the direction—in its inlet chamber 15—of the pressure changes induced through the auxiliary column 27, i.e., it transfers in reverse direction via conduit 20 in proportion with the degree of opening of valve 32, to the chamber 6 of the first control valve assemblage 3; i.e., an increase of pressure at the outlet (upper end) of auxiliary column 27 corresponds with a decrease of pressure transferred to the chamber 6 of the first control valve assemblage 3, and with an increasing closing of the valve 26. Conversely, on a decrease of pressure at the outlet (upper end) of auxiliary column 27, the pressure rises steadily in chamber 6 of control valve assemblage 3, and the valve 26 accordingly opens increasingly so that then, during temperature programmed operations, the carrier gas pressure at inlet 5a and at the outlet of principal column 5 increases steadily, and the preceding temporary decrease of pressure at the outlet (upper end) of auxiliary column 27 re-balances itself.

It is also possible to replace the action of the adjustable valve 30 by attaching a vessel or chamber to the conduit 23 which is interchangeable with a vessel of different capacity, and which in this way is co-determining the course of time of the pressure program in connection with chamber 29 of the second control valve assemblage 28.

Instead of or in addition, it is also possible, according to FIGURE 3, to attach for the same purpose a chamber 14 to the conduit at 13x, preferably exchangeable with a chamber of different capacity, and/or attach to this chamber an outlet to the atmosphere with an adjustable valve 24 which co-determines by its adjustment the gas-discharge to the atmosphere in the direction of the arrow.

With this, the volume of chamber 14 or the adjustment of valve 24, in proportion to the desired pressure program, can be either kept constant, or changed during the analysis.

Variations and modifications may be made within the scope of the claims, and portions of the improvement may be used without others.

Referring to FIG. 3, in the appended claims the valve 18 and diaphragm 17 with the associated parts is referred to as a "fluid control mechanism responsive to gas pressure from the outlet of the auxiliary column 27."

I claim:
1. A control apparatus for automatically adjusting the inlet gas pressure of a chromatographic column, comprising in combination:
   (a) a reducing valve having an output gas line, for delivering carrier gas at a given maximal pressure,
   (b) a control valve for said carrier gas, said control valve being connected to said output gas line and having an outflow gas line for delivering said carrier gas at a controlled pressure,
   (c) a chromatographic column connected to said outflow gas line to receive the carrier gas therefrom,
   (d) automatic regulator means including a pneumatic pressure-responsive device for actuating said control valve in opening and closing directions so as to tend to maintain a substantially constant gas pressure in said outflow gas line as said carrier gas flows through the chromatographic column, and
   (e) an auxiliary variable-pressure control means connected to said automatic regulator means and altering the constant-pressure characteristic of said automatic regulator means, said auxiliary control means being also connected to one of said gas lines and being responsive to pressure changes therein for applying to said pressure-responsive device a reduced control gas pressure whose value varies with pressure variations in said one gas line, thereby tending to cause the pressure-responsive device to actuate the control valve either more or less in its opening direction depending on whether or not greater or lesser gas-line pressures respectively exist.

2. An apparatus as in claim 1, wherein:
(a) said auxiliary control means includes a pressure-reducing mechanism comprising a throttling valve.

3. An apparatus as in claim 1, wherein:
(a) said auxiliary control means includes a pressure-reducing mechanism comprising a capillary tube,
(b) and means detachably securing the capillary tube in said control for replacement by another capillary tube.

4. An apparatus as in claim 1, wherein:
(a) said auxiliary control means comprises a pressure-reducing mechanism,
(b) and a shut-off valve disposed between the pressure-reducing mechanism and said one gas line.

5. An apparatus as in claim 1, wherein:
(a) said auxiliary control means includes a plurality of pressure-reducing mechanisms connected in parallel,
(b) and a shut-off valve disposed between one pressure-reducing mechanism and said one gas line,
(c) said pressure-reducing mechanisms comprising capillary tubes.

6. An apparatus as in claim 1, wherein:
(a) said auxiliary control means comprises a pressure-reducing mechanism,
(b) said auxiliary control means including a gas-tight chamber communicating with said gas line through said pressure-reducing mechanism.

7. An apparatus as in claim 1, wherein,
(a) said auxiliary control means comprises a pressure-reducing mechanism,
(b) said auxiliary control means including a gas-tight chamber communicating with said gas line through said pressure-reducing mechanism,
(c) means detachably mounting said gas-tight chamber in said auxiliary control means to enable its replacement by a chamber of different capacity,
(d) said gas-tight chamber comprising a gas conducting tube connected to the pressure-reducing mechanism to receive gas therefrom.

8. An apparatus as in claim 1, wherein:
(a) said auxiliary control means includes a plurality of pressure-reducing mechanisms connected in parallel,
(b) and a shut-off valve disposed between one pressure-reducing mechanism and said one gas line,
(c) said auxiliary control means including gas-tight chambers communicating with said gas line through said pressure-reducing mechanisms,
(d) and means detachably mounting one of said gas-tight chambers for removal and replacement by a chamber of different capacity,
(e) and means including a valve for controlling communication of one of said gas-tight chambers with the atmosphere.

9. An apparatus as in claim 1, wherein:
(a) said auxiliary control means includes a plurality of pressure-reducing mechanisms at least one of which is a throttling device,
(b) said auxiliary control means including a plurality of gas-tight chambers communicating with said gas line respectively through said pressure-reducing mechanisms,
(c) means detachably mounting one gas-tight chamber for removal and replacement,
(d) and a valve connected to the said throttling device, to render it operative or inoperative.

10. An apparatus as in claim 1, wherein:
(a) said automatic means includes a spring acting on the pressure responsive device in a direction tending to make it open said control valve.

11. An apparatus as in claim 1, wherein:
(a) said automatic means includes a spring acting on the pressure responsive device in a direction tending to make it open said control valve,
(b) and means for adjusting the tension of said spring.

12. An apparatus as in claim 1, wherein:
(a) means are provided for adjusting said reducing valve.

13. An apparatus as in claim 1, wherein:
(a) said auxiliary control means is connected to said output gas line.

14. An apparatus as in claim 1, wherein:
(a) said auxiliary control means is connected to said outflow gas line.

15. An apparatus as in claim 1, wherein:
(a) said auxiliary control means comprises an auxiliary chromatographic column connected to said outflow gas line,
(b) said auxiliary control means further comprising a fluid control mechanism responsive to gas pressure from the outlet of the auxiliary column, for controlling said reduced gas pressure applied to the pressure-responsive device,
(c) said auxiliary column being shorter than and having a smaller time constant than the first-mentioned chromatographic column,
(d) means including a heater and a casing enclosing the heater and both columns, for maintaining the same at equal temperatures.

16. An apparatus as in claim 15, wherein:
(a) said auxiliary control means comprises a pressure-reducing device separate from the auxiliary column and connected to said one gas line,
(b) said fluid control mechanism comprising a second control valve connected with said pressure-responsive device, and a second pressure-responsive device coupled to the second control valve to actuate the latter,
(c) means providing on one side of said second pressure-responsive device a gas pressure from the outlet of said auxiliary column, to effect control of said second control valve,
(d) said pressure-reducing device being connected with said second control valve,
(e) said second control valve communicating with the other side of said second pressure-responsive device, to enable gas pressure from the pressure-reducing device to act in opposition to pressure from the auxiliary column when the second control valve is open,
(f) said second control valve tending to close with decreases in the pressure from the auxiliary column and tending to open with increases in the pressure from the auxiliary column.

17. An apparatus as in claim 15, wherein:
(a) said auxiliary control means includes a pressure-reducing device in the form of a capillary tube, connected to said outflow gas line and to said fluid control mechanism.

18. An apparatus as in claim 15, wherein:
(a) said auxiliary control means comprises a pressure-reducing device separate from the auxiliary column and connected to said one gas line,
(b) said fluid control mechanism comprising a second control valve connected with said pressure-responsive device, and a second pressure-responsive device coupled to the second control valve to actuate the latter,
(c) means providing on one side of said second pressure-responsive device a gas pressure from the outlet of said auxiliary column, to effect control of said second control valve,
(d) said pressure-reducing device being connected with said second control valve,
(e) said second control valve communicating with the other side of said second pressure-responsive device, to enable gas pressure from the pressure-reducing device to act in opposition to pressure from the auxiliary column when the second control valve is open,
(f) said second control valve tending to close with decreases in the pressure from the auxiliary column and tending to open with increases in the pressure from the auxiliary column,
(g) adjustable means providing for communication between the atmosphere and said other side of said second pressure-responsive device.

19. An apparatus as in claim 15, wherein:
(a) said auxiliary control means comprises a pressure-reducing device separate from the auxiliary column and connected to said one gas line,
(b) said fluid control mechanism comprising a second control valve connected with said pressure-responsive device, and a second pressure-responsive device coupled to the second control valve to actuate the latter,
(c) means providing on one side of said second pressure-responsive device a gas pressure from the outlet of said auxiliary column, to effect control of said second control valve,
(d) said pressure-reducing device being connected with said second control valve,
(e) said second control valve communicating with the other side of said second pressure-responsive device, to enable gas pressure from the pressure-reducing device to act in opposition to pressure from the auxiliary column when the second control valve is open,
(f) said second control valve tending to close with decreases in the pressure from the auxiliary column and tending to open with increases in the pressure from the auxiliary column,
(g) a spring acting on said second control valve, tending to close the same.

20. An apparatus as in claim 1, wherein:
(a) said auxiliary control means comprises an auxiliary chromatographic column connected to said outflow gas line,
(b) said auxiliary control means further comprising a fluid control mechanism responsive to gas pressure from the outlet of the auxiilary column, for controlling said reduced gas pressure applied to the pressure-responsive device.
(c) said auxiliary column being shorter than and having a smaller time constant than the first-mentioned chromatographic column,
(d) means including a heater and a casing enclosing the heater and both columns, for maintaining the same at equal temperatures.
(e) means for adjusting the heat provided by said heater.

References Cited

UNITED STATES PATENTS 3,240,052   3/1966   Reinecke et al. _____ 73—23.1

OTHER REFERENCES

Guild, et al.: Chpt. 18, p. 230 Gas Chromatography, Amsterdam, 1958, ed. D.H. Desty, London, Butterworths Scientific Publications, 1958.

Skrokov, M. R.: "Flow Controllers," Power, vol. 101(2) (1957), pp. 98–101.

RICHARD C. QUEISSER, *Primary Examiner.*

VICTOR J. TOTH, *Assistant Examiner.*